(12) United States Patent
Chang

(10) Patent No.: US 10,259,089 B2
(45) Date of Patent: Apr. 16, 2019

(54) COOLING SYSTEM OF MACHINE TOOL BODY CASTING

(71) Applicant: MAXXTRON TECHNOLOGY CO., LTD., Taichung (TW)

(72) Inventor: Cheng-Tsung Chang, Taichung (TW)

(73) Assignee: MAXXTRON TECHNOLOGY CO., LTD, Taichung (TW)

( * ) Notice: Subject to any disclaimer, the term of this patent is extended or adjusted under 35 U.S.C. 154(b) by 0 days.

(21) Appl. No.: 15/461,840

(22) Filed: Mar. 17, 2017

(65) Prior Publication Data

US 2018/0264612 A1   Sep. 20, 2018

(51) Int. Cl.
| | |
|---|---|
| *B23Q 11/12* | (2006.01) |
| *B23Q 1/01* | (2006.01) |
| *F28D 1/047* | (2006.01) |
| *F28D 1/02* | (2006.01) |
| *F28F 9/013* | (2006.01) |
| *F28F 1/32* | (2006.01) |
| *F28D 21/00* | (2006.01) |

(52) U.S. Cl.
CPC ............ *B23Q 11/128* (2013.01); *B23Q 1/015* (2013.01); *F28D 1/024* (2013.01); *F28D 1/0477* (2013.01); *F28D 2021/004* (2013.01); *F28F 1/32* (2013.01); *F28F 9/013* (2013.01)

(58) Field of Classification Search
CPC ... B23Q 11/126; B23Q 11/128; B23Q 11/141; B23Q 11/148; F24F 2013/205; F24F 13/30

USPC ....................................... 62/426; 165/122, 47
See application file for complete search history.

(56) References Cited

U.S. PATENT DOCUMENTS

| | | | | |
|---|---|---|---|---|
| 1,978,460 | A * | 10/1934 | Hofferberth ............ | F24F 5/001 126/67 |
| 2,221,127 | A * | 11/1940 | Bates ...................... | B23F 23/12 165/206 |
| 2,475,755 | A * | 7/1949 | Pearson ............... | B60H 1/3235 62/168 |
| 2,963,882 | A * | 12/1960 | Malkoff et al. ....... | F25D 17/067 62/276 |
| 6,528,905 | B1 * | 3/2003 | Hwang et al. .......... | H02K 9/04 310/12.05 |
| 2005/0076658 | A1 * | 4/2005 | Parpajola ............. | B23Q 11/128 62/127 |

* cited by examiner

*Primary Examiner* — Allen J Flanigan
(74) *Attorney, Agent, or Firm* — WPAT, PC

(57) ABSTRACT

A cooling system of machine tool body casting includes a body casting, a cooling device, and a fan. The body casting is provided with an inner space, an inlet end, and an outlet end. The inlet end and the outlet end are connected with the inner space. The cooling device is disposed at the inlet end. The fan is disposed on one side of the cooling device for inputting external air, such that the external air is input into the inner space and discharged from the outlet end. Therefore, the fan triggers the cold air to flow in the inner space for cooling down the heat of the body casting.

3 Claims, 5 Drawing Sheets

COOLING SYSTEM OF MACHINE TOOL BODY CASTING

BACKGROUND OF THE INVENTION

1. Field of the Invention

The present invention relates to cooling systems, and more particularly, to a cooling system of machine tool body casting.

2. Description of the Related Art

A conventional tool machine applies a structure of inner channels for achieving the cooling function. A coolant is injected into the channels by a cooling machine, such that the coolant carries away the heat generated by the tool machine for cooling the tool machine. However, the traditional cooling area covers only the region surrounding the coolant channels, so that the cooling effect upon the tool machine is compromised. Also, the cost of coolant channels arrangement remains high, and the issues of coolant leakage still exist.

In addition, a conventional conditioning system for a manufacturing machine includes air tubes that are disposed between the sheet metal and the body castings, and the air tubes are provided with plural openings including an adjustable electromagnetic valve for controlling the air volume. Therefore, cooling air is delivered for cooling the machine.

However, the cooling air is delivered by use of the air tube, so that the air volume at the distal end of the tube is insufficient. The cooling effect at the distal end of the tube is compromised, and the heat of the machine components is not effectively reduced. Also, plural openings are disposed between the sheet metal and the body casting in the aforementioned patent disclosure. As a result, volume of the cooling air disperses through the openings, hence the cooling effect is further compromised. Furthermore, the structural arrangement of the air tubes is complicated, causing a higher manufacturing cost.

SUMMARY OF THE INVENTION

For improving the issues above, the present invention discloses a cooling system of machine tool body casting. Cooling air is triggered by a fan to flow through the inner part of the body casting, thereby cooling the heat of the machine tool body castings.

For achieving the aforementioned objectives, an embodiment of the present invention provides a cooling system of machine tool body casting, the body casting provided with an inner space, an inlet end, and an outlet end, the inlet end and the outlet end connected with the inner space, the cooling system, comprising:

a cooling device disposed at the inlet end; and a fan disposed on one side of the cooling device for inputting external air, such that the external air is input into the inner space and discharged from the outlet end.

In an embodiment of the present invention, the cooling device and the fan are disposed in the inner space.

In an embodiment of the present invention, the fan faces away from the inlet end and is attached to the cooling device.

In an embodiment of the present invention, the surface of the body casting comprises plural hollow bores.

In an embodiment of the present invention, the cooling device is connected with an inflow tube and an outflow tube. The inflow tube and the outflow tube are further connected with a cooling machine, such that the cooling machine cycles a coolant between the cooling machine and the cooling device.

In an embodiment of the present invention, the body casting is formed in an up-right orientation, wherein the inlet end and the outlet end are transversely disposed on two neighboring sides of the body casting.

In an embodiment of the present invention, the body casting is formed in a transversely lying orientation, wherein the inlet end and the outlet end are axially disposed at two ends of the body casting.

With such configuration, the fan delivers the external air to be cooled down by the cooling device, so that the external air is turned into cold air and flows in the inner space, whereby the cold air cools down the heat of the machine tool body casting. Also, compared to the prior art, no additional tubes are to be installed. Therefore, the overall structure is simplified and flexible for manufacturing and installation process.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 5, an embodiment of the present invention provides a cooling system of machine tool body casting, comprising a body casting 10 and a cooling system.

Figure 1:
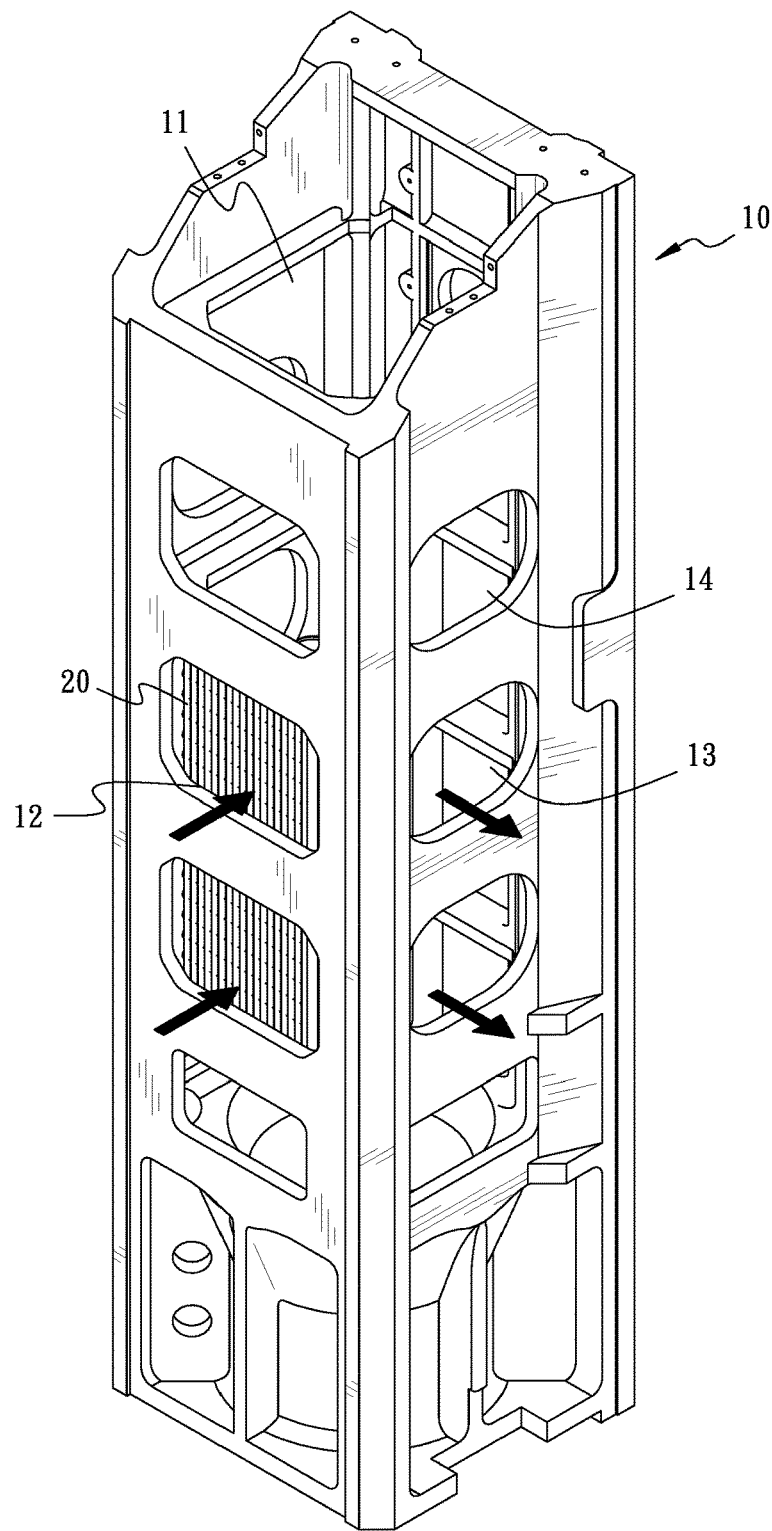
FIG. 1 is a schematic view illustrating the cooling system of machine tool body casting operated on an up-right oriented body casting.
Figure 2:
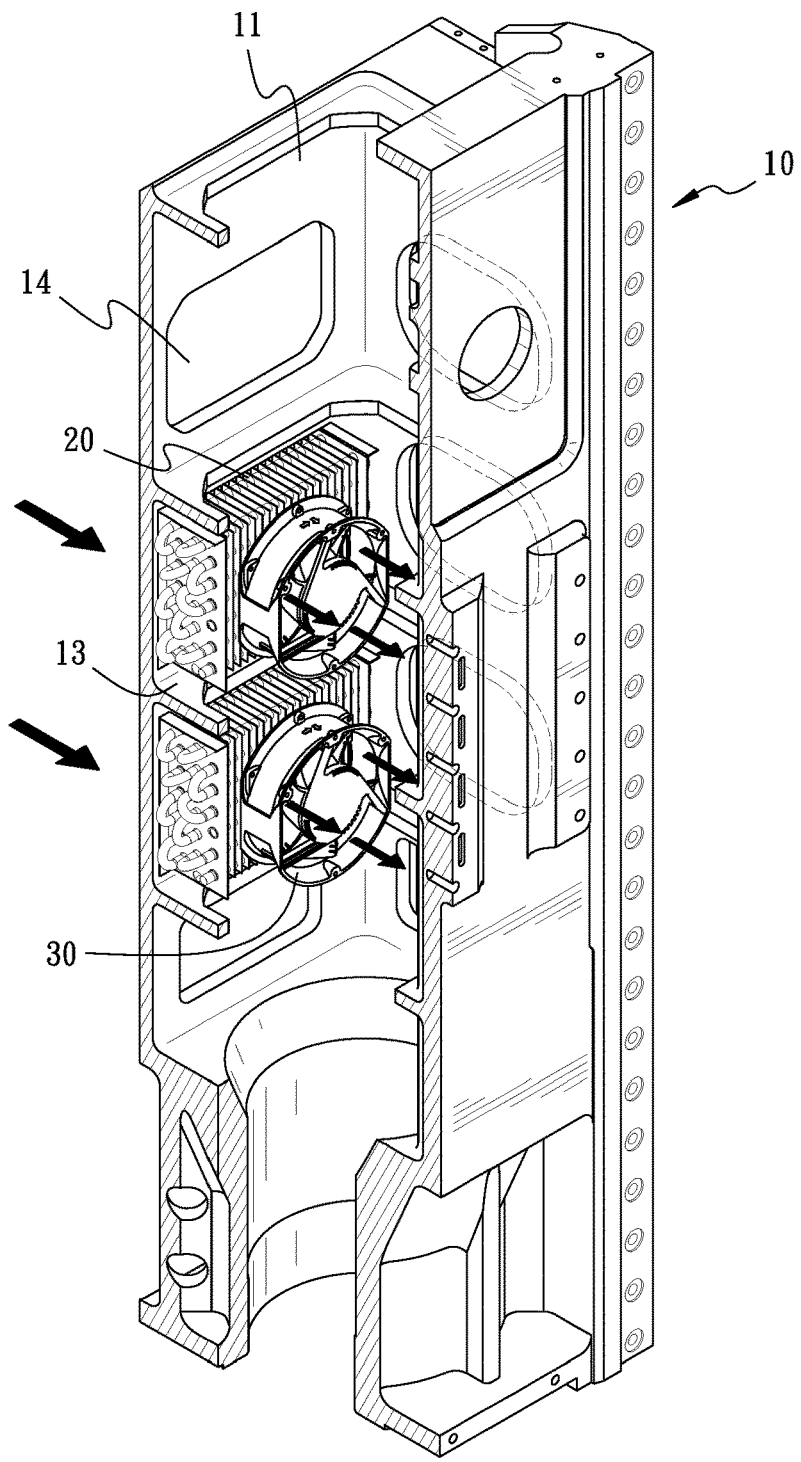
FIG. 2 is a schematic view of FIG. 1 taken from another point of view.
Figure 3:
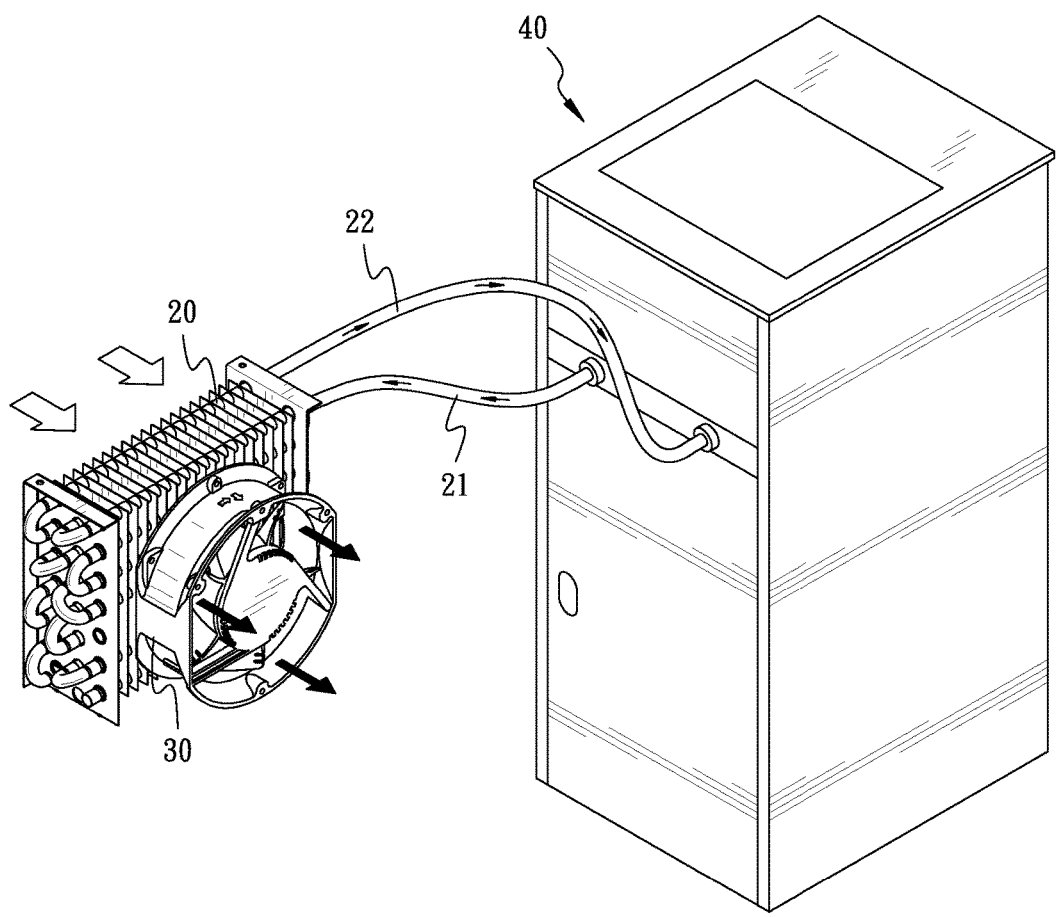
FIG. 3 is a schematic view illustrating the structure of the cooling system in accordance with an embodiment of the present invention.
Figure 4:
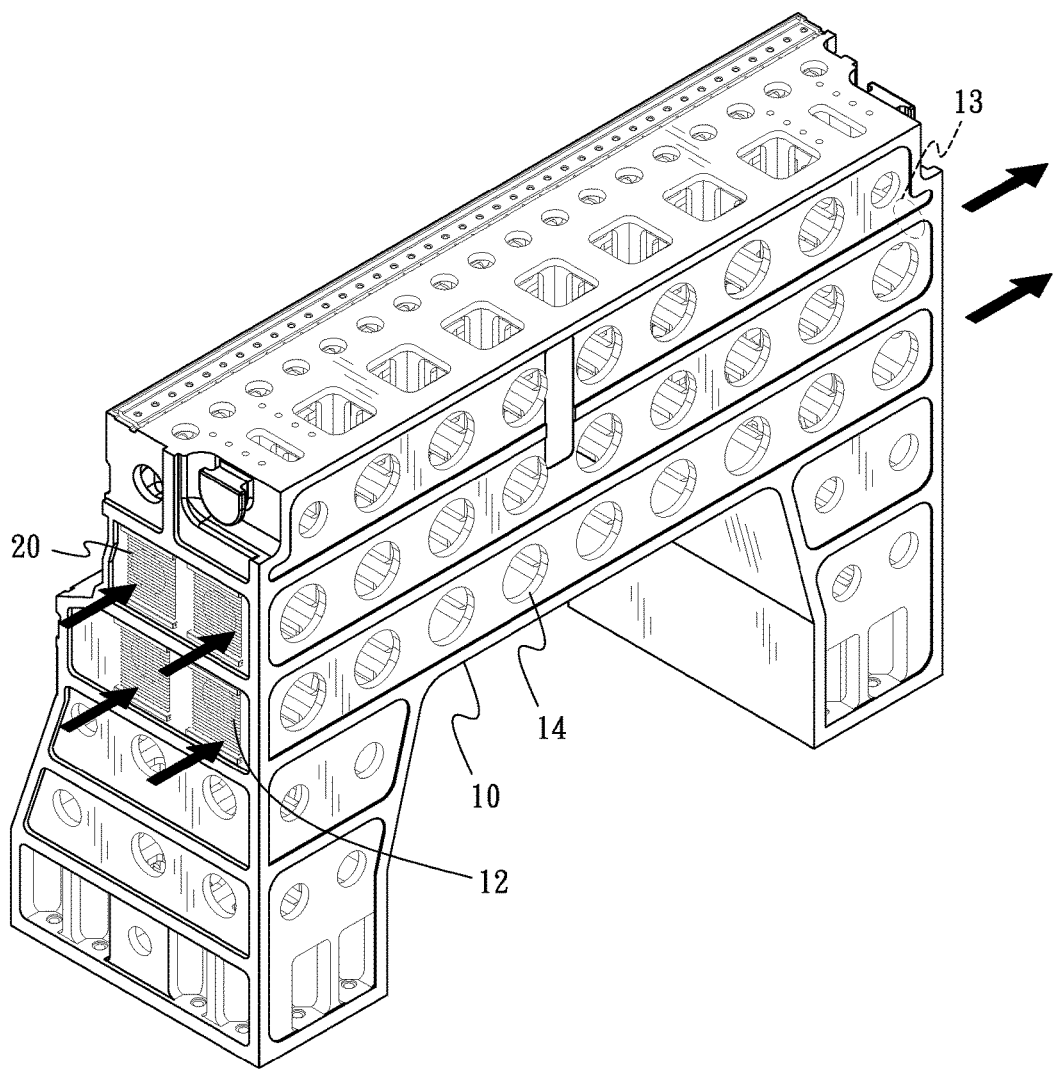
FIG. 4 is a schematic view illustrating the cooling system operated on a transversely lying casting.
Figure 5:
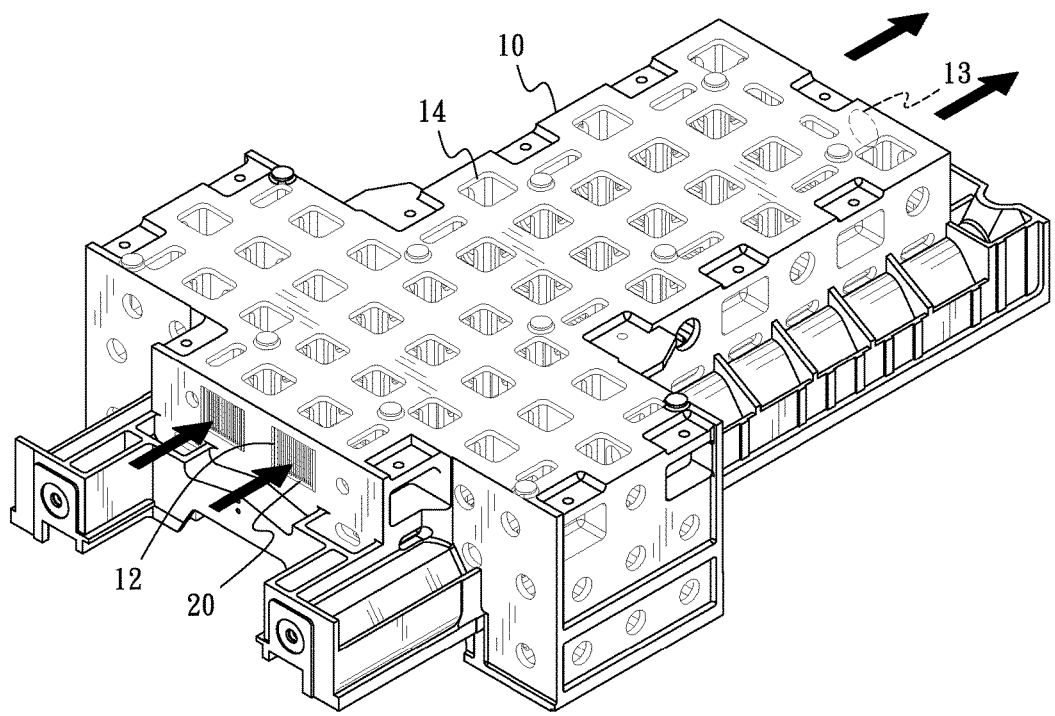
FIG. 5 is a schematic view illustrating the cooling system operated on another transversely lying casting.

The body casting 10 is a part of the machine tool. The body casting 10 is allowed to be formed in an up-right orientation referring to FIG. 1 and FIG. 2 or in a transversely lying orientation referring to FIG. 4 and FIG. 5. The body casting 10 is provided with an inner space 11 and an inlet end 12 and an outlet end 13 that are connected with the inner space 11. As shown in FIG. 2, the inlet end 12 and the outlet end 13 are transversely disposed on two sides of the body casting 10. Alternately in another embodiment as shown in FIG. 4 and FIG. 5, the inlet end 12 and the outlet end 13 are axially disposed at two ends of the body casting 10. The surface of the body casting 10 is provided with plural hollow bores 14 that are connected with the inner space 11, the inlet end 12, and the outlet end 13. The hollow bores 14 are able to be formed in a circular shape or non-circular shape, and the hollow bores 14 facilitate the air flowing.

The cooling system includes a cooling device 20, a fan 30, and a cooling machine 40. The cooling device 20 is disposed at the inlet end 12. In an embodiment of the present invention, the cooling device 20 and the fan 30 are both disposed in the inner space 11 by use of the environment provided by the body casting 10, such that the cooling device 20 and the fan 30 are not exposed from the body casting 10. In such configuration, the amount of the cooling device 20 and the fan 30 in the cooling system are allowed to be varied depending on the arrangement of the heat source of the machine tool for facilitating the heat cooling process.

The fan 30 is disposed on one side of the cooling device 20 and faces away from the inlet end 12. In an embodiment of the present invention, the fan 30 is attached to the cooling device 20. By use of the fan 30, external air is input into the inner space 11 by the cooling device 20 and discharged from the outlet 13.

Furthermore, the cooling device 20 is connected with an inflow tube 21 and an outflow tube 22, wherein the inflow tube 21 and the outflow tube 22 are connected with the cooling machine 40, such that the cooling machine 40 cycles a coolant cycles between the cooling machine 40 and the cooling device 20. In an embodiment of the present invention, the cooling machine 40 in such configuration is originally possessed by the machine tool instead of being additionally provided, such that the originally established device configuration is efficiently exploited.

With the foregoing configuration, the coolant flows through the cooling device 20 to cool down the temperature of the cooling device 20; next, the fan 30 delivers the external air to be cooled down by the cooling device 20, such that the external air is turned into cold air which flows in the inner space 11 (or being input or discharged through the hollow bores 14, as shown by FIG. 2), wherein the inner space 11 acts like channels to facilitate the cold air cooling down the temperature of the body casting 10. Therefore, the heat generating portions of the machine tool are cooled down, preventing the castings from being structurally deformed due to the heat and imposing negative effects upon the manufacturing accuracy.

In addition, a temperature sensor is allowed to be installed inside the body casting 10 provided by the embodiment of the present invention for sensing the temperatures of different portions of the body casting 10. With the air flow volume controlled by the fan 30, the heat cooling efficiency upon different areas is allowed to be increased or decreased.

To sum up, the cooling system of machine tool body casting provided by the embodiments of the present invention is able to be applied in a body casting 10 formed in, for example but not limited to, an up-right orientation or a transversely lying orientation, wherein the overall cooling system is operable on the head portion, seat portion, or pillar portion of the machine tool. Compared to prior arts, the inner space 11 of the body casting 10 is applied as channels without other additional tubes, simplifying the overall structure and enhancing the flexibility of installation thereof. Further, regarding the prior arts, the cold air easily flows through between the body castings and the sheet metal, such that the cold air disperses to lower the heat cooling efficiency. In contrast, in the embodiments provided by the present invention, the fan 30 controls the air flow volume, such that the cold air flows in the inner space 11, efficiently lowering the temperature of the body castings, preventing the manufacturing accuracy from being affected, and enhancing the cooling efficiency. Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A cooling system of a machine tool, comprising:
a body casting provided with an inner space, an inlet end having an inlet, and an outlet end having an outlet, the inlet end and the outlet end connected with the inner space, with an outer face of the body casting provided with a plurality of hollow bores that are linearly arranged, the hollow bores connected with the inner space, the inlet and the outlet being one of the hollow bores, respectively;
a cooling device disposed at the inlet end; and
a fan disposed on one side of the cooling device for inputting external air into the inlet end via the inlet, such that the external air is input into the inner space and discharged from the outlet end via the outlet.
2. The cooling system of claim 1, wherein the cooling device and the fan are disposed in the inner space.
3. The cooling system of claim 2, wherein the fan is attached to the cooling device and faces away from the inlet end.

* * * * *